(12) United States Patent
Wan

(10) Patent No.: US 7,756,857 B2
(45) Date of Patent: Jul. 13, 2010

(54) INDEXING AND QUERYING OF STRUCTURED DOCUMENTS

(75) Inventor: Ernest Yiu Cheong Wan, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 406 days.

(21) Appl. No.: 10/461,483

(22) Filed: Jun. 16, 2003

(65) Prior Publication Data
US 2003/0233618 A1    Dec. 18, 2003

(30) Foreign Application Priority Data
Jun. 17, 2002    (AU) .................................... PS3004

(51) Int. Cl.
*G06F 17/00* (2006.01)
(52) U.S. Cl. ...................................... 707/715; 707/741
(58) Field of Classification Search ................. 707/2, 707/10
See application file for complete search history.

(56) References Cited

U.S. PATENT DOCUMENTS

| | | | | |
|---|---|---|---|---|
| 5,701,469 A * | 12/1997 | Brandli et al. | ............... | 707/102 |
| 5,758,146 A * | 5/1998 | Schiefer et al. | ................. | 707/2 |
| 6,169,983 B1 * | 1/2001 | Chaudhuri et al. | .............. | 707/2 |
| 6,366,934 B1 * | 4/2002 | Cheng et al. | ................. | 715/210 |
| 6,519,597 B1 * | 2/2003 | Cheng et al. | ................... | 707/10 |
| 6,571,233 B2 * | 5/2003 | Beavin et al. | ................... | 707/2 |
| 6,584,458 B1 * | 6/2003 | Millett et al. | ................... | 707/3 |
| 6,625,596 B1 * | 9/2003 | Nunez | ............................ | 707/3 |
| 6,654,734 B1 * | 11/2003 | Mani et al. | ..................... | 707/2 |
| 6,910,029 B1 * | 6/2005 | Sundaresan | ..................... | 707/2 |
| 2001/0049675 A1 | 12/2001 | Mandler et al. | ................. | 707/1 |
| 2002/0083048 A1 * | 6/2002 | Tenorio et al. | .................. | 707/2 |

FOREIGN PATENT DOCUMENTS

| | | |
|---|---|---|
| WO | 00/45304 | 3/2000 |
| WO | 01/33433 | 10/2001 |
| WO | 02/05089 | 1/2002 |

OTHER PUBLICATIONS

Australian Examiner's Report dated Nov. 17, 2004 in corresponding Australian Application No. 2003204729.

* cited by examiner

*Primary Examiner*—Tim T. Vo
*Assistant Examiner*—Mahesh H Dwivedi
(74) *Attorney, Agent, or Firm*—Fitzpatrick, Cella, Harper & Scinto (57) ABSTRACT

A method is disclosed that can be used to reduce the size of the indexes 130 of structured-documents 150. The method uses the schema 110 of structured documents 180, in particular XML documents, to determine the existence of certain deterministic relationships 140 among the indexing components 170. Using such knowledge when indexing the data and formulating query execution plans can greatly reduce the size of the indices 170 and allow querying of such documents more efficiently.

15 Claims, 3 Drawing Sheets

Fig. 5 ure results; and performs said original query, said post-retrieval processing comprises the sub-steps of: locating the location of the one or more non-indexed components existing in the one or more intermediate results that were substituted in the original query; and generating a final result set to satisfy the original query using the located non-indexed components.

INDEXING AND QUERYING OF STRUCTURED DOCUMENTS

FIELD OF INVENTION

The present invention relates to the indexing and querying of structured-documents and, in particular, to the indexing and querying of XML documents.

BACKGROUND

Structured documents may be stored in traditional file systems or in databases. With traditional file systems, entire documents are stored. Searching and retrieving data from a large collection of documents is cumbersome. Typically, text based databases provide more flexible and efficient searching and retrieval capability. Object databases and object-relational databases have been used for storing structured documents. Since XML (eXtensible Markup Language) is the most prevalent format for structured documents, many object-relational databases have built-in facilities for handling XML documents. These databases are often referred to as XML-enabled. XML-enabled object-relational databases map the XML data to relational tables and support structural search through their underlying query facilities by reformulating XPath or XQuery expressions to SQL queries. Recently, a number of so called Native XML databases have also been developed for storing XML documents. Native XML databases store the XML data in raw XML or a proprietary format and build indices on elements and attributes to allow fast searching.

With all XML-enabled object-relational databases and some native XML databases, indices are only created on a small number of fields. Searching non-indexed fields is very inefficient. On the other hand, in many native XML databases, all element and attribute names and values are indexed. The large indices make updating such databases of structured documents very inefficient.

SUMMARY

It is an object of the present invention to substantially overcome, or at least ameliorate, one or more disadvantages of existing arrangements.

In accordance with one aspect of the present invention there is provided a method of indexing structured documents, the method comprising the steps of: parsing at least one schema of the structured documents to determine predefined deterministic relationships between components of the structured documents to be indexed; removing from one or more sets of indices those components whose occurrences can be deduced by virtue of said determined predefined deterministic relationships from occurrences of another indexing component to provide corresponding one or more smaller sets of indices; and indexing said structured documents in accordance with said one or more smaller sets of indices.

In accordance with another aspect of the present invention there is provided a method of querying structured documents, wherein said structured documents comprise a plurality of components and have one or more associated sets of indices of indexing components, the method comprising the steps of: reformulating an original query substituting references to one or more non-indexing components in the query with references to said indexing components using predefined deterministic relationships predetermined from schemas of the structured documents wherever possible; querying said structured documents using said reformulated query and said one or more sets of indices of indexing components to provide one or more sets of intermediate results; and performing post-retrieval processing on the one or more sets of intermediate results to form the final result of said original query, said post-retrieval processing comprises the sub-steps of: locating the location of the one or more non-indexed components existing in the one or more intermediate results that were substituted in the original query; and generating a final result set to satisfy the original query using the located non-indexed components.

In accordance with another aspect of the present invention there is provided apparatus for indexing structured documents, the apparatus comprising: means for parsing one or more schemas of the structured documents to determine predefined deterministic relationships between components of the structured documents to be indexed; means for removing from one or more sets of indices those components whose occurrences can be deduced by virtue of said determined predefined deterministic relationships from occurrences of another indexing component to provide corresponding one or more smaller sets of indices; and means for indexing said structured documents in accordance with said one or more smaller sets of indices.

In accordance with another aspect of the present invention there is provided apparatus for querying structured documents, wherein said structured documents comprise a plurality of components and have one or more associated sets of indices of indexing components, the apparatus comprising: means for reformulating an original query substituting references to one or more non-indexing components in the query with references to said indexing components using predefined deterministic relationships predetermined from schemas of the structured documents wherever possible; means for querying said structured documents using said reformulated query and said one or more sets of indices of indexing components to provide one or more sets of intermediate results; and means for performing post-retrieval processing on the one or more sets of intermediate results to form the final result of said original query, said post-retrieval processing means comprises: means for locating the location of the one or more non-indexed components existing in the one or more intermediate results that were substituted in the original query; and means for generating a final result set to satisfy the original query using the located non-indexed components.

In accordance with another aspect of the present invention there is provided a computer program for indexing structured documents, the computer program comprising: code for parsing one or more schemas of the structured documents to determine predefined deterministic relationships between components of the structured documents to be indexed; code for removing from one or more sets of indices those components whose occurrences can be deduced by virtue of said determined predefined deterministic relationships from occurrences of another indexing component to provide corresponding one or more smaller sets of indices; and code for indexing said structured documents in accordance with said one or more smaller sets of indices.

In accordance with another aspect of the present invention there is provided a computer program for querying structured documents, wherein said structured documents comprise a plurality of components and have one or more associated sets of indices of indexing components, the computer program comprising: code for reformulating an original query substituting references to one or more non-indexing components in the query with references to said indexing components using predefined deterministic relationships predetermined from schemas of the structured documents wherever possible; code for querying said structured documents using said reformulated query and said one or more sets of indices of indexing components to provide one or more sets of intermediate results; and code for performing post-retrieval processing on the one or more sets of intermediate results to form the final result of said original query, said post-retrieval processing code comprises: code for locating the location of the one or more non-indexed components existing in the one or more intermediate results that were substituted in the original query; and code for generating a final result set to satisfy the original query using the located non-indexed components.

Other aspects of the invention are also disclosed.

BRIEF DESCRIPTION OF THE DRAWINGS

One or more embodiments of the present invention will now be described with reference to the drawings, in which:

FIG. 5 is a flow chart depicting the preferred method of querying; and the appendix in which:

Table A is an example DTD used for demonstrating the preferred methods;

Table B shows an example XML document that conforms to the DTD of Table A;

Table C shows an example compact index list created by the preferred method of indexing in response to the parsing of the DTD of Table A;

Table D shows an example mapping list created by the preferred method of indexing in response to the parsing of the DTD of Table A;

Table E shows the example XML of Table B illustrating the assignation of node numbers by the preferred method of indexing;

Table F shows an example lexicon created by the preferred method of indexing after the document of Table B is added to the database;

Table G shows an example inverted list for those element and attributes names created by the preferred method after the document of Table B is added to the database;

Table H shows the example inverted list for those remaining element names and attributes names;

Table I shows an inverted list for attribute values created by the preferred method of indexing after the document of Table B is added to the database; and Table J shows an inverted list for element values created by the preferred method of indexing after the document of Table B is added to the database.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

The principles of the preferred method described herein have general applicability to indexing and querying of structured documents. However, for ease of explanation, the steps of the preferred methods are described with reference to the indexing and querying of XML documents. However, it is not intended that the present invention be limited to the described methods. For example, the invention may have application to other types of structured documents such as SGML documents.

The preferred methods use the schemas of the XML data such as the DTD or XML Schemas to determine the existence of certain deterministic relationships among the indexing components. Using such knowledge when indexing the data and formulating query execution plans can greatly reduce the size of the indices and allow update and searching to be performed more efficiently. For instance, if the schema of the XML data declare that an element, say A, always exists with another element, say B, then the preferred methods can index A without indexing B. When searching for the occurrences of B, the original query is reformulated into one that searches for the occurrences of A. The Bs associated with the As found are located in a post-retrieval scan and returned in the final query result.

Figure 1:
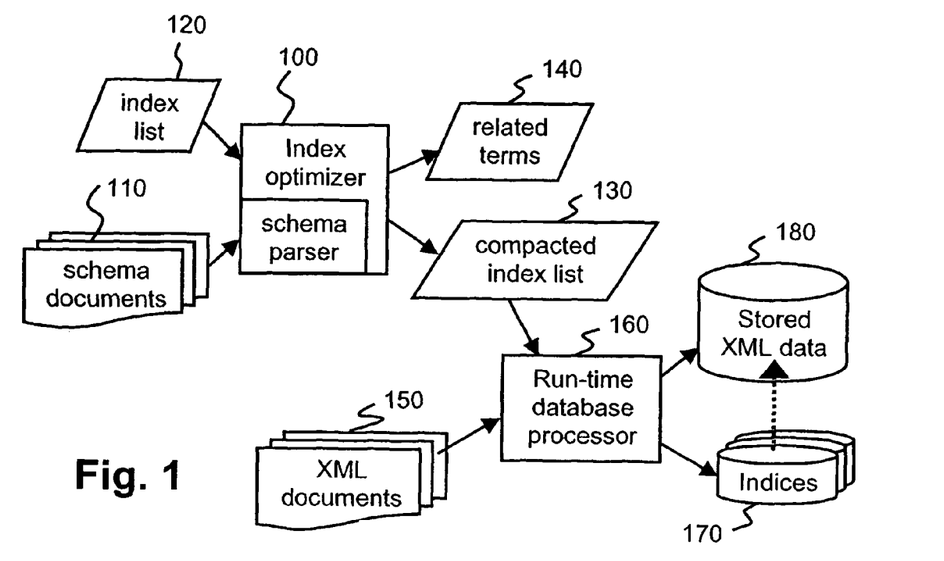
FIG. 1 is a block diagram of an overview of the preferred method of indexing.

A high-level block diagram is illustrated in FIG. 1 to provide an overview of the indexing process of the preferred indexing method. An Index Optimizer 100 parses the schema documents 110 that defines the schemas of a class of XML documents to determine the existence of certain deterministic relationships among the schema components. The Index Optimizer 100 removes indexing terms that possess such a deterministic relationship with another indexing term (for instance, an element that is the first mandatory child of another indexing element) from the full list of pre-defined indexing terms 120, creating a more compacted list of indexing terms 130 and reducing the number of terms that are actually indexed. The Index Optimizer 100 also adds the removed terms to another list 140 that maps each removed term to its related indexing term. The smaller index allows the database of XML documents to be updated and searched more efficiently This smaller index also allows the index to be easily cached, (ie. maintaining the index in memory) increasing the efficiency even further. However, the Index Optimizer 100 has to trade off indexing efficiency and retrieval complexity and may not remove all indexing terms that can be removed from the full index list 120.

When XML documents 150 are added to the database or updated, the Run-time Database Processor 160 creates or updates indices 170 only for terms that appear in the compacted index list 130. The indices 170 point to the occurrences of the indexing terms in the stored XML data 180 allowing them to be located efficiently.

Figure 2:
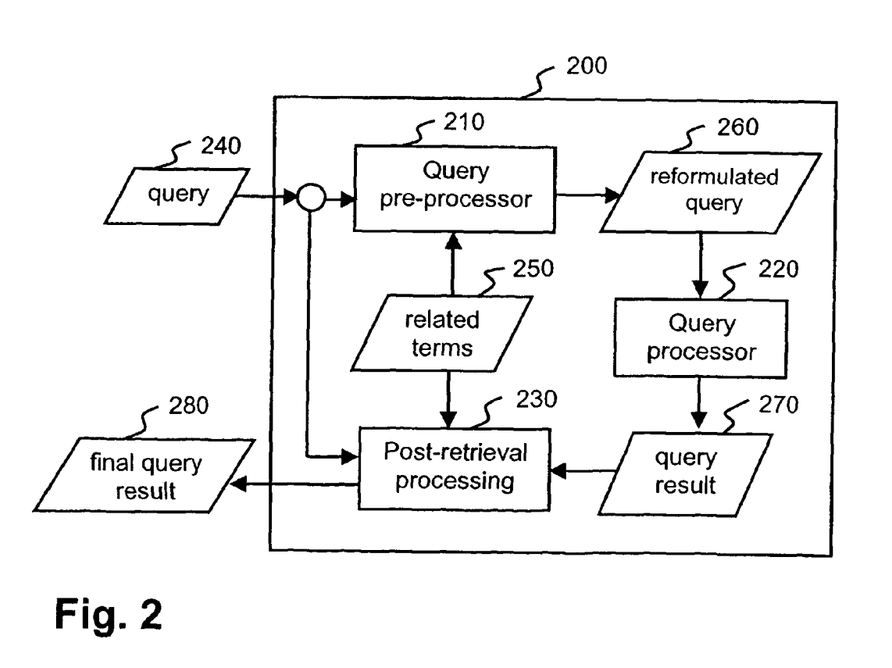
FIG. 2 is a block diagram of an overview of the preferred method of querying.

A high-level block diagram is illustrated in FIG. 2 to provide an overview of the associated query processor of the preferred querying method. An Extended Query Processor 200 that comprises a Query Pre-processor 210, a conventional Query Processor 220, and a Post-retrieval Processing module 230 is used. The Query Pre-processor 210 modifies the high-level query 240 by substituting references of any removed indexing terms with references to the indexing terms they mapped to in the list 250 (that is, the list 140 in FIG. 1). The resulting reformulated query 260 is processed by the conventional Query Processor 220 which parses and analyzes the query, formulates a query execution plan, then generates calls to the Run-time Database Query Processor 220 for executing the plan. The query result 270 produced is then passed to the Post-retrieval Processing module 230. The Post-retrieval Processing module 230 checks for the selection criteria substituted or left out when reformulating the query. The Post-retrieval Processing module 230 comprises steps that scan the result of the reformulated query to locate the non-indexed terms in the original query 240 and/or compute the offset of these terms to an associated indexing term using additional information stored with the list 250.

Table A shows an example DTD (Document Type Definitions) that defines the schema of a class of XML documents that store employee records. Table B shows an example document that conforms to the DTD of Table A. Existing native XML databases either automatically index all element and attribute names and values (that is, treating all element and attribute names and values as indexing terms) or only allow a database administrator to manually specify a small number of schema components (such as the id attribute of the element person and the element person/name) as indexing terms. Instead of simply using the fill list of indexing terms, the preferred indexing method as depicted in the overview in FIG. 1, will analyze the schema document, namely the DTD as shown in Table A, and uses certain deterministic relationships among the schema components to reduce the number of indexing terms. For instance, as name, gender, division, position and location are mandatory child elements of the element parent, the occurrences of person/name, person/gender, person/division, person/position and person/location are implied by the occurrences of person. Hence, the path of these elements will not be indexed by the preferred method. However, since the values of these elements can take on either a number of pre-defined values or arbitrary values, their values will still be indexed. The approach is demonstrated in the example depicted in Tables C, D, E, F, G, H, I, and J. Those skilled in the art will recognize that the described example is only one of many possible ways of practicing the preferred method.

In Tables C, D, E, F, G, H, I, and J, a native XML database system that automatically indexes selected element and attribute names and values is assumed. The Index Optimizer (100 of FIG. 1) of the database parses and analyses the DTD of Table A and creates two lists. A compacted list of indexing terms as shown in Table C, and a list as shown in Table D that maps the remaining non-indexed terms to indexing terms (140 of FIG. 1). It will be apparent to those skilled in the art that the full set of terms in the Element (path) field of Tables C and D constitute all of the element and attribute (path) terms of this particular example DTD as shown in Table A. Preferably, the Element (path) terms, Attribute (path) terms, and their Values are stored in three separate tables and have three corresponding separate indices. In this particular example, for sake of simplicity, the Attribute (path) terms are also stored in the Element (path) lists of Tables C and D.

Preferably, the XML is encoded in such a manner that the offset between some non-indexed elements and its associated indexing element in the mapping list as shown in Table D can be computed in advance. In our example, the text (of attributes and elements) is encoded separately from the structure (represented by the XML tags) so that each element node (or element instance in an XML document) is encoded with a fixed-size header of h bits, followed by the required attributes each encoded using a bits, the child element nodes, and then the optional attributes. Each leaf node is assumed to be encoded using e bits and point to its separately encoded textual content if the node is not empty. With such encoding, the Index Optimizer can compute the exact offsets between some non-indexed elements and its associated indexing element and store the offsets in a list as shown in Table D. The presence of optional elements make computing in advance the exact offsets for some of the non-indexed elements impossible. However, an offset can still be computed for these elements and used as the starting point in a post-retrieval scan.

When the example document as shown in Table B is added to the database, each element node of the document is assigned a unique number that is referred herein as a node number. The node number comprises information that enables the database processor to compute the physical location of the stored data that the node number references. For the sake of clarity, in the example, the node number of an element instance is simply formed by concatenating the 1-based index of the nodes that lead from the root element to the element instance as shown in the first column of Table E. For instance, the first child of the root element is assigned the node identifier 1.1 and the second child of the first child of the root element is assigned the node identifier 1.1.2. The node number of the root element can be treated as a document number.

The Run-time database processor (160 of FIG. 1) in this particular example is assumed to create an inverted file index for element and attribute names and values. Table F shows a lexicon which contains all the element names that appear in the database after the single document as shown in Table A has been added to the database. The lexicon of Table F maps a term—an element name in this case—to its associated entry in the inverted file index as shown in Table G. The inverted list file index as shown in Table G stores a list of pointers to all occurrences of the term in the stored data. In the example, the pointers are node numbers. For the sake of comparison only, Table H is illustrated to show the inverted lists that are rendered unnecessary, as a result of the preferred method. That is the preferred method does not in fact index the document as shown in Table A with regard to the terms shown in Table H. Consequently, the size of the indices is greatly reduced by the preferred method and this allows update and searching of the database to be performed more efficiently.

Two other inverted files are used by the database in the example: one for the value of the attributes as shown in Table I and one for the textual value of the elements as shown in Table J. The most straightforward approach is assumed in the example. Each word that appeared in the value of an attribute or element is used as an indexing term without any case folding (that is, the replacing of all uppercase characters with their lowercase equivalents) or stemming (that is, reducing a word to its root word). When the following XQuery:

```
for $p in //personnel/person
where $p/location/city = "Chatswood"
return $p/name
``` is made to the database selected by the query, where $p is a variable to every object in the database. The Query Pre-Processor (210 of FIG. 2) may reformulate the query to:

```
for $p in //personnel/person
where contains($p, "Chatswood")
return $p
``` using the relationships between non-indexed elements and indexing elements depicted in the list as shown in Table D (250 of FIG. 2). It should be noted that a query can be reformulated in a number of different ways depending on the design of the database system The Query Processor (220 of FIG. 2) then processes the reformulated query. The Query Processor 220 looks up the element name index of Table G for the occurrences of the nodes/personnel/person and locates the node 1.1, 1.2, 1.3, 1.4, 1.5, 1.6. The Query Processor 220 also looks up the element value index as shown in Table J for the value that contains the word "Chatswood" and locates the nodes 1.3.5.2, 1.4.5.2, 1.5.5.2 and 1.6.5.2. From the node numbers, the Query processor can decide that only nodes 1.3, 1.4, 1.5, 1.6 satisfy the query. These nodes are fetched and form the intermediate query result (270 of FIG. 2). The Post-retrieval Processing module (230 of FIG. 2) then verifies that the term "Chatswood" found in these node are indeed the values of their child element location/city. The offset information in the list as shown in Table D allows the element node/personnel/person/location/city to be located and checked quickly. The offset information also allows the elements nodes/personnel/person/name to be located quickly and returned as the final query result (280 of FIG. 2).

Figure 4:
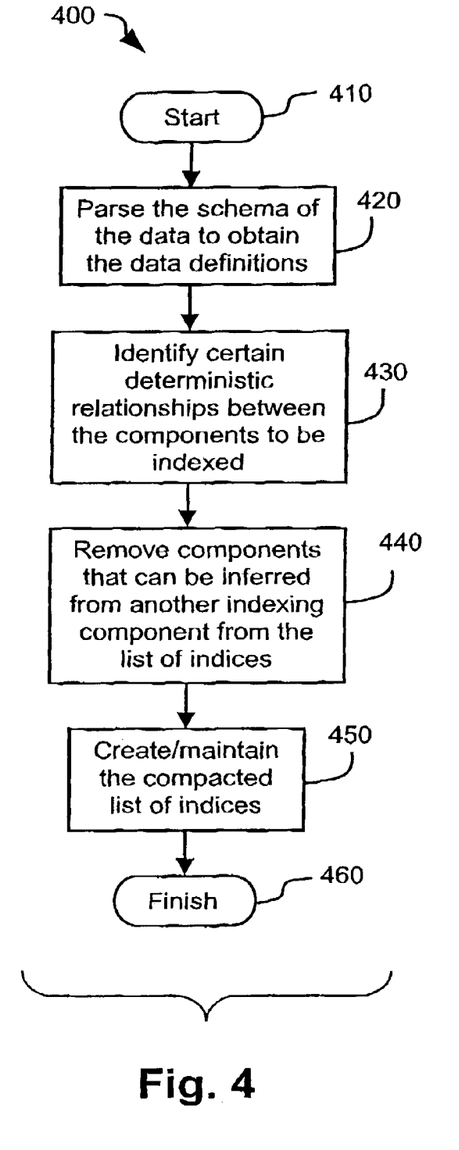
FIG. 4 is a flow chart depicting the preferred method of indexing.

Turning now to FIG. 4, there is shown a flow chart of the preferred method of indexing. The preferred method 400 of indexing commences at step 410, where any necessary parameters are initialised. The preferred method 400 then proceeds to step 420, where the preferred method 400 parses the schemas of the data, for example the DTD document defining a class of XML documents. The preferred method 400 in step 430 then identifies from the parsed DTD document whether there exists any predefined deterministic relationships among the components to be indexed (for instance, an element that is the first mandatory child of another indexing element). After completion of step 430, the preferred method then proceeds to step 440. In step 440, the preferred method 400 then removes these identified components that can be inferred from other indexing components from a full list of index components, thus forming a smaller list of index components. These removed components in step 440 are also added to another list that maps each substituted or removed component to its related indexing component. After step 440, the preferred method 400 in step 450 then creates or updates indices of the database of structured documents, eg. XML documents, only for the components that appear in the smaller list of index components. The indices point to the occurrences of the indexing terms in the stored XML data allowing them to be located efficiently.

Figure 5:
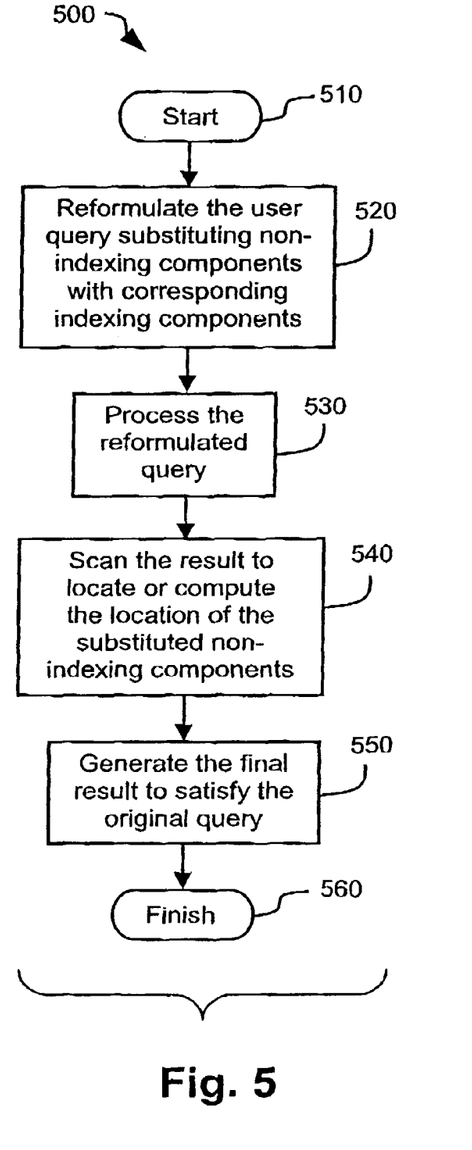

Turning now to FIG. 5, there is shown a flow chart of the preferred method of querying. The preferred method 500 of querying commences at step 510, where any necessary parameters are initialised. The preferred method 500 then proceeds to step 520, where user query is received, and the preferred method 500 reformulates the query by substituting those non-indexed components in the query with their corresponding indexing components utilising the mapping list generated during the indexing method 400. After this step 520, the preferred method 500 proceeds to step 530, where the reformulated query is processed. During this processing 530, the preferred method 500 queries the XML database utilising this reformulated query to obtain intermediate query results and then proceeds to step 540. The preferred method 500 in step 540 then determines the location of any of the non-indexed components existing in the intermediate results that were substituted in the original query. Preferably, during this step 540, the preferred method 500 scans and computes the location of these 'substituted' non-indexed components in the intermediate results, by computing the offset of these components to an associated indexing component using information stored with the non-indexed list. Alternatively, during this step 540, the preferred method 500 may scan the entire intermediate results to locate these 'substituted' non-indexed components in the intermediate results. After completion of step 540, the preferred method 500 then in step 550, generates a final result set to satisfy the original query using the aforementioned located non-indexed components.

It should be noted that in a simple query the set of intermediate query results is same or larger than the set of final query results. Thus, in the case where the original query involves logical operators, the reformulated query of the preferred query method 500 return a plurality of sets of intermediate query results. When this is the case, the preferred query method 500 will apply any unprocessed operators to the plurality of intermediate query results to generate a final resultant set to satisfy the original query using the located non-indexed components.

Figure 3:
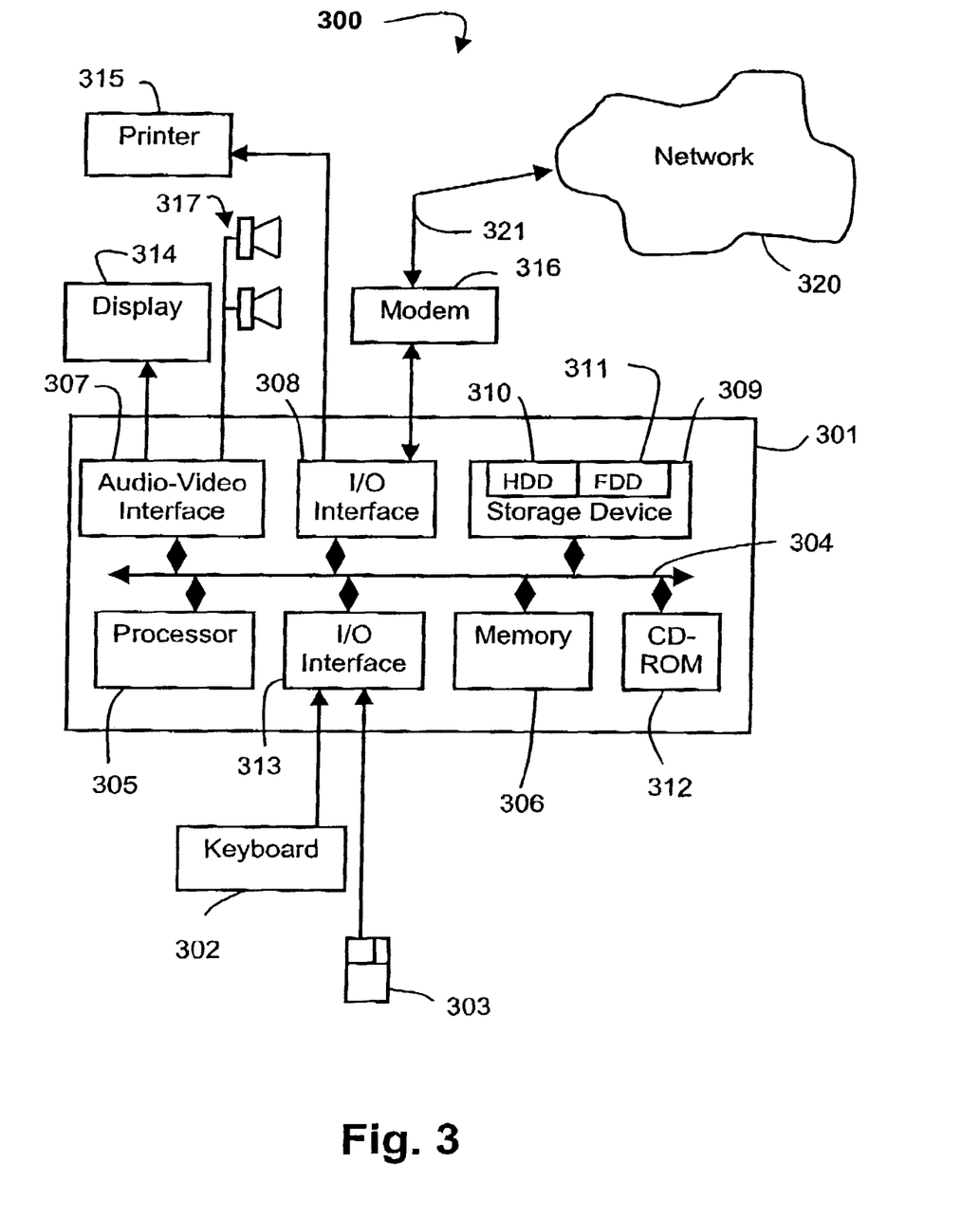
FIG. 3 is a block diagram of a general purpose computer upon which the preferred methods can be practised.

The preferred methods of indexing and querying are preferably practiced using a general-purpose computer system 800, such as that shown in FIG. 3 wherein the processes of FIGS. 1 and 4, and 2 and 5 may be implemented as software, such as an application program executing within the computer system 800. In particular, the steps of preferred methods of indexing and querying are effected by instructions in the software that are carried out by the computer. The instructions may be formed as one or more code modules, each for performing one or more particular tasks. The software may also be divided into two separate parts, in which a first part performs the indexing and querying methods and a second part manages a user interface between the first part and the user. The software may be stored in a computer readable medium, comprising the storage devices described below, for example. The software is loaded into the computer from the computer readable medium, and then executed by the computer. A computer readable medium having such software or computer program recorded on the medium is a computer program product. The use of the computer program product in the computer is preferably effects an advantageous apparatus for indexing and apparatus for querying.

The computer system 300 is formed by a computer module 301, input devices such as a keyboard 302 and mouse 303, output devices comprising a printer 315, a display device 314 and loudspeakers 317. A Modulator-Demodulator (Modem) transceiver device 316 is used by the computer module 301 for communicating to and from a communications network 320, for example connectable via a telephone line 321 or other functional medium. The modem 316 can be used to obtain access to the Internet, and other network systems, such as a Local Area Network (LAN) or a Wide Area Network (WAN), and may be incorporated into the computer module 301 in some implementations.

The computer module 301 typically comprises at least one processor unit 305, and a memory unit 306, fox example formed from semiconductor random access memory (RAM) and read only memory (ROM). The module 301 also comprises an number of input/output (I/O) interfaces comprising an audio-video interface 307 that couples to the video display 314 and loudspeakers 317, an I/O interface 313 for the keyboard 302 and mouse 303 and optionally a joystick (not illustrated), and an interface 308 for the modem 316 and printer 315. In some implementations, the modem 316 may be incorporated within the computer module 301, for example within the interface 308. A storage device 309 is provided and typically comprises a hard disk drive 310 and a floppy disk drive 311. A magnetic tape drive (not illustrated) may also be used. A CD-ROM drive 312 is typically provided as a non-volatile source of data. The components 305 to 313 of the computer module 301, typically communicate via an interconnected bus 304 and in a manner that results in a conventional mode of operation of the computer system 300 known to those in the relevant art. Examples of computers on which the described arrangements can be practised comprise IBM-PC's and compatibles, Sun Sparcstations or alike computer systems evolved therefrom.

Typically, the application program is resident on the hard disk drive 310 and read and controlled in its execution by the processor 305. Intermediate storage of the program and any data fetched from the network 320 may be accomplished using the semiconductor memory 306, possibly in concert with the hard disk drive 310. In some instances, the application program may be supplied to the user encoded on a CD-ROM or floppy disk and read via the corresponding drive 312 or 311, or alternatively may be read by the user from the network 320 via the modem device 316. Still further, the software can also be loaded into the computer system 300 from other computer readable media. The term "computer readable medium" as used herein refers to any storage or transmission medium that participates in providing instructions and/or data to the computer system 300 for execution and/or processing. Examples of storage media comprise floppy disks, magnetic tape, CD-ROM, a hard disk drive, a ROM or integrated circuit, a magneto-optical disk, or a computer readable card such as a PCMCIA card and the like, whether or not such devices are internal or external of the computer module 301. Examples of transmission media comprise radio or infra-red transmission channels as well as a network connection to another computer or networked device, and the Internet or Intranets comprising e-mail transmissions and information recorded on Websites and the like.

INDUSTRIAL APPLICABILITY

It is apparent from the above that the arrangements described are applicable to the database and data processing industries.

The foregoing describes only some embodiments of the present invention, and modifications and/or changes can be made thereto without departing from the scope and spirit of the invention, the embodiments being illustrative and not restrictive.

TABLE A

```
<?xml encoding="UTF-8"?>
<!ELEMENT personnel (person)+>
<!ELEMENT person (name, gender, division, position, location,
    supervisor*, contactNumber*, email*)>
<!ATTLIST person Id ID #REQUIRED>
<!ELEMENT name ((family, given))>
<!ELEMENT family (#PCDATA)>
<!ELEMENT given (#PCDATA)>
<!ELEMENT location (state, city, street?)>
<!ELEMENT state (NSW|VIC|WA|SA|TAS|NT|ACT)>
<!ELEMENT city (#PCDATA)>
<!ELEMENT street (#PCDATA)>
<!ELEMENT supervisor EMPTY>
<!ATTLIST supervisor id IDREF #REQUIRED>
<!ELEMENT gender (male|female)>
<!ELEMENT division (#PCDATA)>
<!ELEMENT position (#PCDATA)>
<!ELEMENT contactNumber (#PCDATA)>
<!ELEMENT email (#PCDATA)>
```

TABLE B

```
<?xml version="1.0" encoding="UTF-8"?>
<!DOCTYPE personnel SYSTEM "personnel.dtd">
<personnel>
<person id="329756">
<name>
<family>James</family>
<given>John</given>
</name>
<gender>male</gender>
```

TABLE B-continued

```
<division>Administration</division>
<position>CEO</position>
<location>
<state>NSW</state>
<city>Sydney</city>
</location>
<email>John.James@foo.com.au</email>
</person>
<person id="843575">
<name>
<family>Lee</family>
<given>Sara</given>
</name>
<gender>female</gender>
<division>Administration</division>
<position>secretary</position>
<location>
<state>NSW</state>
<city>Sydney</city>
</location>
<supervisor id="329756"/>
<email>Sara.Lee@foo.com.au</email>
</person>
<person id="124567"/>
<name>
<family>Smith</family>
<given>Jason</given>
<name>
<gender>male</gender>
<division>Marketing</division>
<position>manager</position>
<location>
<state>NSW</state>
<city>Chatswood</city>
</location>
<supervisor id="329756"/>
<email>Jason.Smith@foo.com.au</email>
</person>
<person id="120498">
<name>
<family>Law</family>
<given>Henry</given>
</name>
<gender>male</gender>
<division>Marketing</division>
<position>salesperson</position>
<location>
<state>NSW</state>
<city>Chatswood</City>
</location>
<supervisor id="124567"/>
<email>Henry.Law@foo.com.au</email>
</person>
<person id="223134">
<name>
<family>Johnston</family>
<given>Catherine</given>
</name>
<gender>femafe</gender>
<division>Marketing</division>
<position>salespOrson</position>
<location>
<state>NSW</state>
<city>Chatswood</city>
</location>
<supervisor id="124567"/>
<email>Catherine.Johnston@foo.com.au</email>
</person>
<person id="854765">
<name>
<family>Taylor</family>
<given>Mary</given>
</name>
<gender>female</gender>
<division>Marketing</division>
<position>receptonist</position>
<location>
<state>NSW</state>
<city>Chatswood </city>
```

TABLE B-continued

```
        </location>
        <supervisor id="124567"/>
        <email>Mary.Taylor@foo.com.au</email>
    </person>
</personnel>
```

TABLE C

Element (path)

personnel
personnel/person
personnel/person/location/steet
personnel/person/supeivisor
personnel/personl/contactNumber
personnel/person/email
person
person/location/street
person/supervisor
person/contactNumber
person/email
name
location
location/street
supervisor
gender
division
position
contactNumber
email

TABLE D

| Element (path) | Indexed element | Offset |
|---|---|---|
| personnel/person/@id | personnel/person | h |
| personnel/person/supervisor/@id | personnel/person/supervisor | h |
| personnel/person/name | personnel/person | h+a |
| personnel/person/name/family | personnel/person | 2h+a |
| personnel/person/name/given | personnel/person | 2h+a+e |
| personnel/person/gender | personnel/person | 2h+a+2e |
| personnel/person/division | personnel/person | 2h+a+3e |
| personnel/person/position | personnel/person | 2h+a+4e |
| personnel/person/location | personnel/person | 2h+a+5e |
| personnel/person/location/state | personnel/person | 3h+a+5e |
| personnel/person/location/city | personnel/person | 3n+a+6e |
| person/@id | person | h |
| person/supervisor/@id | person/supervisor | h |
| person/name/family | person | h+a |
| person/name/given | person | h+a+e |
| person/gender | person | h+a+2e |
| person/division | person | h+a+3e |
| person/position | person | h+a+4e |
| person/localion | person | h+a+5e |
| person/location/state | person | 2h+a+5e |
| person/location/city | person | 2n+a+6e |
| name/family | name | h |
| name/given | name | h+e |
| location/state | location | h |
| location/city | location | h+e |

TABLE E

| Node number | XML data stored |
|---|---|
| 1 | `<personnel>` |
| 1.1 | `<person id="329756">` |
| 1.1.1 | `<name>` |
| 1.1.1.1 | `<family>James</family>` |
| 1.1.1.2 | `<given>John</given>` |
|  | `<name>` |

TABLE E-continued

| Node number | XML data stored |
|---|---|
| 1.1.2 | `<gender>male</gender>` |
| 1.1.3 | `<division>Administration</division>` |
| 1.1.4 | `<position>CEO</position>` |
| 1.1.5 | `<location>` |
| 1.1.5.1 | `<state>NSW</state>` |
| 1.1.5.2 | `<city>Sydney</city>` |
|  | `</location>` |
| 1.1.6 | `<email>John.James@foo.com.au</email>` |
|  | `</person>` |
| 1.2 | `<person id="843575">` |
| 1.2.1 | `<name>` |
| 1.2.1.1 | `<family>Lee</family>` |
| 1.2.1.2 | `<given>Sara</given>` |
|  | `<name>` |
| 1.2.2 | `<gender>female</gender>` |
| 1.2.3 | `<division>Administration</division>` |
| 1.2.4 | `<position>secretary</position>` |
| 1.2.5 | `<location>` |
| 1.2.5.1 | `<state>NSW</state>` |
| 1.2.5.2 | `<city>Sydney</city>` |
|  | `</location>` |
| 1.2.6 | `<supervisor id="329756"/>` |
| 1.2.7 | `<email>Sara.Lee@foo.com.au</email>` |
|  | `</person>` |
| 1.3 | `<person id="124567">` |
| 1.3.1 | `<name>` |
| 1.3.1.1 | `<family>Smith</family>` |
| 1.3.1.2 | `<given>Jason</given>` |
|  | `</name>` |
| 1.3.2 | `<gender>male</gender>` |
| 1.3.3 | `<division>Marketing</division>` |
| 1.3.4 | `<position>manager</position>` |
| 1.3.5 | `<location>` |
| 1.3.5.1 | `<state>NSW</state>` |
| 1.3.5.2 | `<city>Chatswood</city>` |
|  | `</location>` |
| 1.3.6 | `<supervisor id="329756"/>` |
| 1.3.7 | `<email>Jason.Smith@foo.com.au</email>` |
|  | `</person>` |
| 1.4 | `<person id="120498">` |
| 1.4.1 | `<name>` |
| 1.4.1.1 | `<family>Law</family>` |
| 1.4.1.2 | `<given>Henry</given>` |
|  | `</name>` |
| 1.4.2 | `<gender>male</gender>` |
| 1.4.3 | `<division>Marketing</division>` |
| 1.4.4 | `<position>salesperson</position>` |
| 1.4.5 | `<location>` |
| 1.4.5.1 | `<state>NSW</state>` |
| 1.4.5.2 | `<city>Chatswood</city>` |
|  | `</location>` |
| 1.4.6 | `<supervisor id="124567">` |
| 1.4.7 | `<email>Henry.Law@foo.com.au</email>` |
|  | `</person>` |
| 1.5 | `<person id="223134">` |
| 1.5.1 | `<name>` |
| 1.5.1.1 | `<family >Johnston</family >` |
| 1.5.1.2 | `<given>Catherine</given>` |
|  | `<name>` |
| 1.5.2 | `<gender>female</gender>` |
| 1.5.3 | `<division>Marketing </division>` |
| 1.5.4 | `<position>salesperson</position>` |
| 1.5.5 | `<location>` |
| 1.5.5.1 | `<state>NSW</state>` |
| 1.5.5.2 | `<city>Chatswood</city>` |
|  | `</location>` |
| 1.5.6 | `<supervisor id="124567"/>` |
| 1.5.7 | `<email>Catherine.Johnston@foo.com.au</email` |
|  | `</person>` |
| 1.6 | `<person id="854765">` |
| 1.6.1 | `<name>` |
| 1.6.1.1 | `<family>Taylor</family >` |
| 1.6.1.2 | `<given>Mary</given>` |
|  | `<name>` |

TABLE E-continued

| Node number | XML data stored |
|---|---|
| 1.6.2 | <gender>femafe</gender> |
| 1.6.3 | <division>Marketing</division> |
| 1.6.4 | <position>receptonist</position> |
| 1.6.5 | <location> |
| 1.6.5.1 | <state>NSW</state> |
| 1.6.5.2 | <city>Chatswood</city> |
| | </location> |
| 1.6.6 | <supervisor id="124567"/> |
| 1.6.7 | <email>Mary.Taylor@foo.com.au</email> |
| | </person> |
| | </personnel> |

TABLE F

| Term | Index entry |
|---|---|
| @id | 2, 3 |
| city | 2 |
| division | 2 |
| email | 4 |
| family | 2 |
| gender | 2 |
| given | 2 |
| name | 2 |
| location | 2 |
| person | 2 |
| personnel | 1 |
| position | 2 |
| state | 2 |
| supervisior | 3 |

TABLE G

| index | Element (path) | Inverted list |
|---|---|---|
| 1 | personnel | 1 |
| 2 | personnel/person | 1.1, 1.2, 1.3, 1.4, 1.5, 1.6 |
| 3 | personnel/person/supervisor | 1.2.6, 1.3.6, 1.4.6, 1.5.6, 1.6.6 |
| 4 | personnel/person/email | 1.1.6, 1.2.7, 1.3.7, 1.4.7, 1.5.7, 1.6.7 |

TABLE H

| Element (path) | Inverted list |
|---|---|
| personnel/person/@id | 1.1, 1.2, 1.3, 1.4, 1.5, 1.6 |
| personnel/person/supervisor/@id | 1.2.6, 1.3.6, 1.4.6, 1.5.6, 1.6.6 |
| personnel/person/name | 1.1.1, 1.2.1, 1.3.1, 1.4.1, 1.5.1, 1.6.1 |
| personnel/person/name/family | 1.1.1.1, 1.2.1.1, 1.3.1.1, 1.4.1.1, 1.5.1.1, 1.6.1.1 |
| personnel/person/name/given | 1.1.1.2, 1.2.1.2, 1.3.1.2, 1.4.1.2, 1.5.1.2, 1.6.1.2 |
| personnel/person/gender | 1.1.2, 1.2.2, 1.3.2, 1.4.2, 1.5.2, 1.6.2 |
| personnel/person/division | 1.1.3, 1.2.3, 1.3.3, 1.4.3, 1.5.3, 1.6.3 |
| personnel/person/position | 1.1.4, 1.2.4, 1.3.4, 1.4.4, 1.5.4, 1.6.4 |
| personnel/person/location | 1.1.5, 1.2.5, 1.3.5, 1.4.5, 1.5.5, 1.6.5 |
| personnel/person/location/state | 1.1.5.1, 1.2.5.1. 1.3.5.1, 1.4.5.1, 1.5.5.1, 1.6.5.1 |
| personnel/personhlocation/city | 1.1.5.2, 1.2.5.2, 1.3.5.2, 1.4.5.2, 1.5.5.2, 1.6.5.2 |

TABLE I

| Word | Inverted list |
|---|---|
| 120498 | 1.4 |
| 124567 | 1.3, 1.4.6, 1.5.6, 1.6.6 |
| 223134 | 1.5 |

TABLE I-continued

| Word | Inverted list |
|---|---|
| 329756 | 1.1, 1.3.6 |
| 843575 | 1.2, 1.2.6 |
| 854765 | 1.6 |

TABLE J

| Word | Inverted list |
|---|---|
| Administration | 1.1.4, 1.2.3 |
| Catherine | 1.5.1.2 |
| Catherine.Johnston@foo.com.au | 1.5.7 |
| CEO | 1.1.5 |
| Chatswood | 1.3.5.2, 1.4.5.2, 1.5.5.2, 1.6.5.2 |
| Henry | 1.4.1.2 |
| Henry.Law@foo.com.au | 1.4.7 |
| James | 1.1.1.1 |
| Jason | 1.3.1.2 |
| Jason.Smith@foo.com.au | 1.3.7 |
| John | 1.1.1.2 |
| John.James@foo.com.au | 1.1.6 |
| Johnston | 1.5.1.1 |
| Law | 1.4.1.1 |
| Lee | 1.2.1.1 |
| Marketing | 1.3.3, 1.4.3, 1.5.3, 1.6.3 |
| Mary | 1.6.1.2 |
| Mary.Taylor@foo.com.au | 1.6.7 |
| NSW | 1.1.5.1, 1.2.5.1, 1.3.5.1, 1.4.5.1, 1.5.5.1, 1.6.5.1 |
| Sara | 1.2.1.2 |
| Sara.Lee@foo.com.au | 1.2.7 |
| Smith | 1.3.1.1 |
| Taylor | 1.6.1.1 |
| Sydney | 1.1.5.2, 1.2.5.2 |
| female | 1.2.2, 1.5.2, 1.6.2 |
| male | 1.1.2, 1.3.2, 1.4.2 |
| manager | 1.3.4 |
| receptionist | 1.6.4 |
| sales erson | 1.4.4, 1.5.4 |
| secretary | 1.2.4 |

The claims defining the invention are as follows:

1. A method of querying one or more structured documents with an original query, the method comprising the steps of:

providing a list of indexing components of the structured documents to be queried wherein said indexing components comprise at least markup tags;

parsing at least one schema of the structured documents to determine predefined deterministic relationships between the indexing components;

removing from the list those indexing components whose occurrences can be inferred, using said determined predefined deterministic relationships, from occurrences of another indexing component, to provide a reduced list of indexing components;

indexing said structured documents by generating indices using said reduced list of indexing components, wherein the generated indices point to occurrences of the indexing components included in the reduced list of indexing components within the structured documents;

generating a mapping list that maps the removed indexing components to indexing components in the reduced list of indexing components used to generate the indices;

reformulating an original query by substituting references to one or more removed indexing components in the original query with references to indexing components in said reduced list of indexing components, using the generated mapping list;

querying said one or more structured documents by using said generated indices and said reformulated query to provide one or more sets of intermediate results; and performing post-retrieval processing on the one or more sets of intermediate results to form a final result of said original query, wherein said post-retrieval processing comprises the sub-steps of:

locating the removed indexing components existing in the one or more sets of intermediate results; and generating the final result set to satisfy the original query using the located removed indexing components.

2. A method as claimed in claim 1, further comprising the steps of:

encoding the indexing components of the structured documents in such a manner that said predefined deterministic relationship between any two indexing components is characterized by a fixed offset between the two encoded indexing components; and storing said offsets in said mapping list.

3. A method as claimed in claim 1, wherein said structured documents are XML documents and said schemas are XML schemas.

4. A method as claimed in claim 3, wherein said schemas are DTD documents.

5. A method as claimed in claim 1, wherein the locating sub-step further comprises scanning the one or more sets of intermediate results to locate any of the substituted indexing components existing in the one or more sets of intermediate results.

6. A method as claimed in claim 1, wherein the locating sub-step further comprises computing an offset of the substituted indexing components existing in the one or more sets of intermediate results to an associated indexing component.

7. An apparatus for querying one or more structured documents with an original query, the apparatus comprising:

means for providing a list of indexing components of the structured documents to be queried wherein said indexing components comprise at least markup tags;

means for parsing one or more schemas of the structured documents to determine predefined deterministic relationships between the indexing components;

means for removing from the list those indexing components whose occurrences can be inferred, using said determined predefined deterministic relationships, from occurrences of another indexing component, to provide a reduced list of indexing components;

means for indexing said structured documents by generating indices using said reduced list of indexing components, wherein the generated indices point to occurrences of the indexing components included in the reduced list of indexing components within the structured documents;

means for generating a mapping list that maps the removed indexing components to indexing components in the reduced list of indexing components used to generate the indices;

means for reformulating an original query by substituting references to one or more removed indexing components in the original query with references to indexing components in said reduced list of indexing components, using the generated mapping list;

means for querying said one or more structured documents by using said generated indices and said reformulated query to provide one or more sets of intermediate results; and means for performing post-retrieval processing on the one or more sets of intermediate results to form a final result of said original query, wherein said post-retrieval processing comprises the sub-steps of:

locating the removed indexing components existing in the one or more sets of intermediate results; and generating the final result set to satisfy the original query using the located removed indexing components, wherein each of said predefined deterministic relationships comprises one of: one component as being a mandatory child of another component; and one component as being a mandatory attribute of another component.

8. A computer-readable storage medium storing a computer-executable program, the computer executable program for querying one or more structured documents with an original query, the computer executable program comprising:

code for providing a list of indexing components of the structured documents to be queried wherein said indexing components comprise at least markup tags;

code for parsing one or more schemas of the structured documents to determine predefined deterministic relationships between the indexing components;

code for removing from the list those indexing components whose occurrences can be inferred, using said determined predefined deterministic relationships, from occurrences of another indexing component, to provide a reduced list of indexing components;

code for indexing said structured documents by generating indices using said reduced list of indexing components, wherein the generated indices point to occurrences of the indexing components included in the reduced list of indexing components within the structured documents;

code for generating a mapping list that maps the removed indexing components to indexing components in the reduced list of indexing components used to generate the indices;

code for reformulating an original query by substituting references to one or more removed indexing components in the original query with references to indexing components in said reduced list of indexing components, using the generated mapping list;

code for querying said one or more structured documents by using said generated indices and said reformulated query to provide one or more sets of intermediate results; and code for performing post-retrieval processing on the one or more sets of intermediate results to form a final result of said original query, wherein said post-retrieval processing comprises the sub-steps of:

locating the removed indexing components existing in the one or more sets of intermediate results; and generating the final result set to satisfy the original query using the located removed indexing components wherein each of said predefined deterministic relationships comprises one of: one component as being a mandatory child of another component; and one component as being a mandatory attribute of another component.

9. A method as claimed in claim 1, wherein said structured documents are markup documents.

10. A method as claimed in claim 1, wherein the generated indices are generated by creating new indices only for the indexing components that appear in the reduced list of indexing components.

11. A method as claimed in claim 1, wherein the generated indices are generated by updating existing indices only for the indexing components that appear in the reduced list of indexing components.

12. An apparatus as claimed in claim 7, wherein the generated indices are generated by creating new indices only for the indexing components that appear in the reduced list of indexing components.

13. An apparatus as claimed in claim 7, wherein the generated indices are generated by updating existing indices only for the indexing components that appear in the reduced list of indexing components.

14. A computer-readable storage medium as claimed in claim 8, wherein the generated indices are generated by creating new indices only for the indexing components that appear in the reduced list of indexing components.

15. A computer-readable storage medium as claimed in claim 8, wherein the generated indices are generated by updating existing indices only for the indexing components that appear in the reduced list of indexing components.

* * * * *